(12) United States Patent
Barbaric

(10) Patent No.: US 11,124,363 B2
(45) Date of Patent: Sep. 21, 2021

(54) DEVICE FOR TEMPORARILY STORING PLATE-SHAPED WORKPIECES

(71) Applicant: Stefan Barbaric, Kirchschlag (AT)

(72) Inventor: Stefan Barbaric, Kirchschlag (AT)

( * ) Notice: Subject to any disclaimer, the term of this patent is extended or adjusted under 35 U.S.C. 154(b) by 0 days.

(21) Appl. No.: 16/614,684

(22) PCT Filed: May 15, 2018

(86) PCT No.: PCT/EP2018/062494
§ 371 (c)(1),
(2) Date: Nov. 18, 2019

(87) PCT Pub. No.: WO2018/210798
PCT Pub. Date: Nov. 22, 2018

(65) Prior Publication Data
US 2020/0198890 A1    Jun. 25, 2020

(30) Foreign Application Priority Data

May 19, 2017 (AT) .............................. A 50429/2017

(51) Int. Cl.
| | |
|---|---|
| *B65G 1/06* | (2006.01) |
| *B65G 1/10* | (2006.01) |
| *B65G 1/14* | (2006.01) |
| *B65G 47/51* | (2006.01) |
| *B65G 65/00* | (2006.01) |

(52) U.S. Cl.
CPC .............. *B65G 1/06* (2013.01); *B65G 1/10* (2013.01); *B65G 1/14* (2013.01); *B65G 47/5181* (2013.01);
(Continued)

(58) Field of Classification Search
CPC ... B65G 1/06; B65G 1/10; B65G 1/14; B65G 47/5181; B65G 2201/022; B21D 43/13;
(Continued)

(56) References Cited

U.S. PATENT DOCUMENTS

| 4,382,395 A * | 5/1983 | Haar .................... B21D 28/265 |
| | | 271/14 |
| 5,347,898 A * | 9/1994 | Ito ......................... B21D 43/20 |
| | | 83/112 |

(Continued)

FOREIGN PATENT DOCUMENTS

| CN | 103372618 | 10/2013 |
| CN | 204867599 | 12/2015 |

OTHER PUBLICATIONS

Schneider Electric., "Application Notes: Roller Conveyor (2003)", Retrieved from the internet: http://static.schneider-electric.us/docs/machineControl/0105DB0301.pdf [retrived on Nov. 9, 2017] XP055423399, Dec. 11, 2005, pp. 1-6.

(Continued)

*Primary Examiner* — Kaitlin S Joerger
(74) *Attorney, Agent, or Firm* — Greenblum & Bernstein, P.L.C.

(57) ABSTRACT

Device for temporarily storing plate-shaped workpieces ($W_i$) having a receiving magazine (1) for the plate-shaped workpieces ($W_i$), which magazine is formed by storage compartments arranged one above the other, for which it is proposed that the storage compartments have storage surfaces (7) which can each be extended in a first horizontal direction into a storage region and in a second horizontal direction into a removal region and can be retracted into the receiving magazine (1), wherein a receiving device (2) with a receiver (6) for the plate-shaped workpieces ($W_i$) is arranged in each case in the storage and removal region, which receiving device (2) is movable in the storage or removal region in a plane parallel to the storage surface (7) and in a direction perpendicular to the storage surface (7), and a control and storage unit (9) is provided for controlling the storage and removal movement of the receiver (6) and (Continued)

Figure 1:
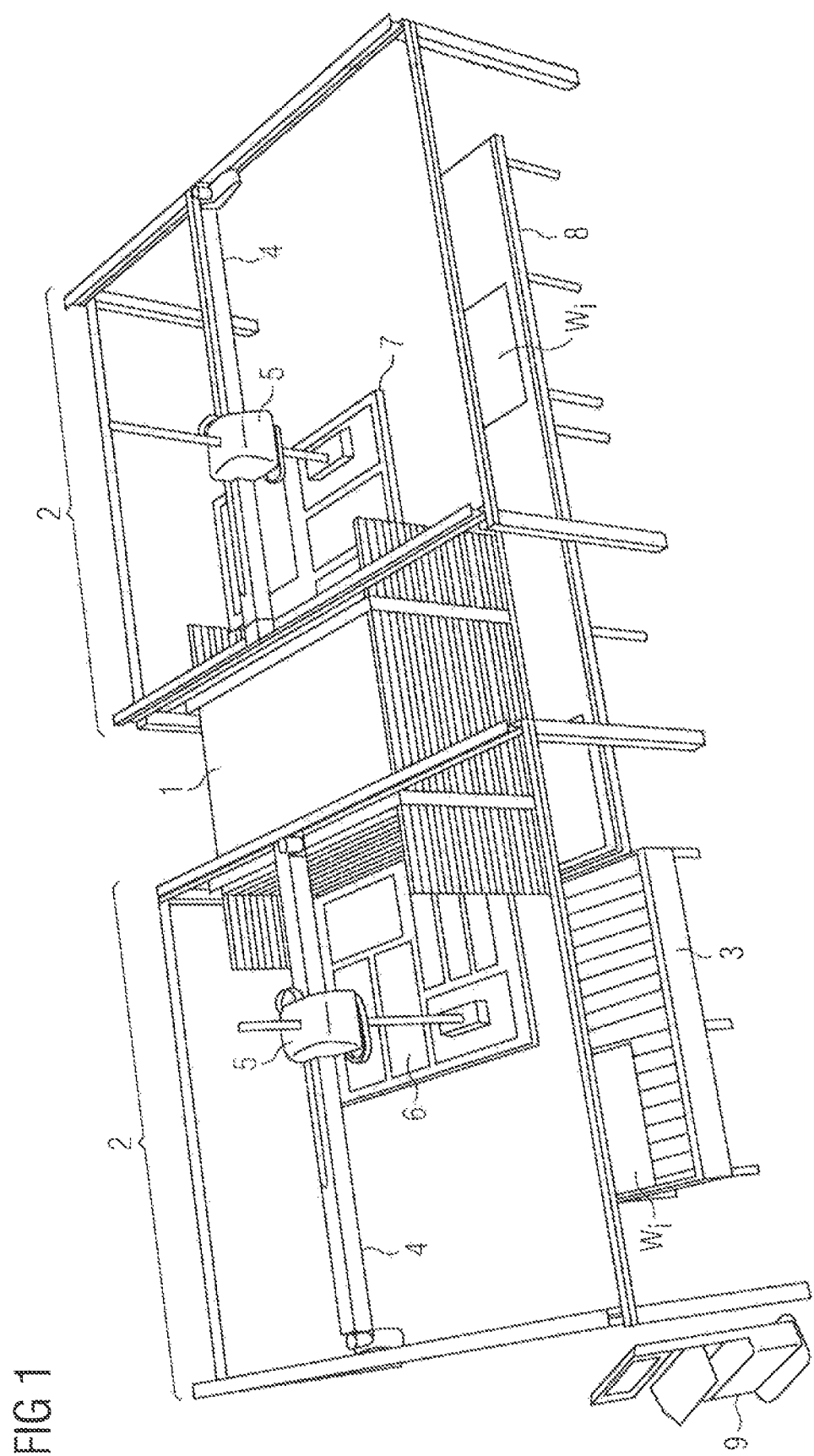

the movement of the storage surfaces (7) and for storing the storage location of plate-shaped workpieces ($W_i$) on the storage surfaces (7).

7 Claims, 5 Drawing Sheets

(52) U.S. Cl.
CPC ........ *B65G 65/00* (2013.01); *B65G 2201/022* (2013.01)

(58) Field of Classification Search
CPC .... B21D 43/20; B21D 43/287; B21D 43/282; B21D 43/24
See application file for complete search history.

(56) References Cited

U.S. PATENT DOCUMENTS

| | | | | |
|---|---|---|---|---|
| 5,941,673 A | * | 8/1999 | Hayakawa | B21D 43/20 414/416.07 |
| 6,006,638 A | * | 12/1999 | Eltringham | B21D 43/20 271/18.1 |
| 8,028,609 B2 | * | 10/2011 | Katsuyama | B21D 43/13 83/78 |
| 10,589,378 B2 | * | 3/2020 | Beransky | B23K 26/0838 |
| 2008/0264758 A1 | | 10/2008 | Katsuyama | |
| 2008/0284094 A1 | | 11/2008 | Ichioka | |
| 2009/0263218 A1 | | 10/2009 | Katsuyama | |
| 2019/0337041 A1 | * | 11/2019 | Morita | B21D 43/22 |
| 2020/0239249 A1 | * | 7/2020 | Wade | B25J 9/0096 |

OTHER PUBLICATIONS

Int'l Search Report (Form PCT/ISA/210) conducted in Int'l Appln. No. PCT/EP2018/062494 (dated Aug. 21, 2018 (w/ English translation).

Int'l Written Opinion (Form PCT/ISA/237) conducted in Int'l Appln. No. PCT/EP2018/062494 (dated Aug. 21, 2018).

China Search Report conducted in counterpart China Appln. No. 201880033032.8 (dated Nov. 4, 2020).

China Office Action conducted in counterpart China Appln. No. 201880033032.8 (dated Nov. 4, 2020).

* cited by examiner

DEVICE FOR TEMPORARILY STORING PLATE-SHAPED WORKPIECES

The invention relates to a device for temporarily storing plate-shaped workpieces having a receiving magazine for the plate-shaped workpieces, formed by storage compartments arranged one above the other, according to the preamble of claim 1.

In production facilities, m particular for cutting, machining and assembling plate-shaped workpieces, for example in the furniture industry, automation is becoming increasingly common. The plate-shaped workpieces are transported between different production machines, where they are automatically cut and processed, and then fed to an assembly or packaging station. The problem here is that the machining time for the different workpieces sometimes varies, for example when different work steps have to be carried out. If, in subsequent stages of production, the different workpieces have to be processed again at the same time, for example in the course of assembly or packaging, the problem of intermediate storage of individual workpieces arises.

In the conventional way, workpieces are temporarily stored in stacks. If required, a workpiece is removed from the warehouse stack. However, if a certain workpiece has to be removed from the warehouse stack, it may be necessary to restack the stacked workpieces, which involves a considerable amount of time and effort with the risk of damaging workpieces. Automation of the stacking and removal of individual workpieces is also hardly possible in this way. This problem of temporary storage arises in particular in the course of the trend towards individual one-off productions and small series. It is therefore the object of the invention to provide a device for temporarily storing plate-shaped workpieces, which not only allows a simple and gentle stacking of plate-shaped workpieces, but in particular also integration into automated production facilities.

This object is achieved through the features of claim 1. Claim 1 relates to a device for temporarily storing plate-shaped workpieces having a receiving magazine for the plate-shaped workpieces formed from storage compartments arranged one above the other, in which it is proposed, in accordance with the invention, that the storage compartments have storage surfaces which can each be extended in a first horizontal direction into a storage region and in a second horizontal direction into a removal region and can be retracted into the receiving magazine, wherein a receiving device with a receiver for the plate-shaped workpieces is arranged in each case in the storage and removal region, which receiving device can be moved in the storage or removal region in a plane parallel to the storage surface and in a direction perpendicular to the storage surface, and a control and storage unit is provided for controlling the storage and removal movement of the receiver and the movement of the storage surfaces and for storing the storage location of plate-shaped workpieces on the storage surfaces.

The storage surfaces allow the plate-shaped workpieces to be stored horizontally. The workpieces are handled by receivers which pick up the workpieces fed to the storage region, move them through the storage region and place them on an extended storage surface. The respective storage surface is then retracted into the receiving magazine again. Subsequently, the storage surface can be extended into a removal region, where another receiver picks up the workpiece and places it, for example, on a conveyor that feeds the workpiece to downstream stations of the production facility. The control of the storage and removal movement of the receiver and the movement of the storage surfaces is carried out by means of a control and storage unit, which is preferably connected via an interface to the controller of the other sections of the production equipment. In modern production facilities, the movement, location and machining condition of individual workpieces passing through the production facility are also tracked. The control and storage unit thus receives data records on individual workpieces that are fed to the storage region and thus also knows, for example, the dimensions of the relevant workpiece. The control and storage unit also has data on the current storage locations of plate-shaped workpieces on the storage surfaces of the receiving magazine. The control and storage unit can thus match the dimensions of the workpieces fed to it with free storage surfaces and initiate an extension movement of a free storage surface. Subsequently, the storage movement of the receiver is controlled in such a way that the respective workpiece is stored on the intended storage surface. The data for the available storage surfaces is updated accordingly. As soon as the control and storage unit receives the request to remove a specific workpiece from subsequent sections of the production device, the storage location of the workpiece is called up, the corresponding storage surface is extended into the removal region and the receiver in the removal region is controlled accordingly so that the workpiece is lifted from the extended storage surface in one removal movement and is placed, for example, on a conveyor.

The storage region and the removal region are preferably arranged on opposite sides of the receiving magazine, so that simultaneous storage and removal of workpieces can take place and the storage and removal speed can thus be increased. The receiver could be designed in different ways, but preferably the receiver is a vacuum receiver. In a vacuum receiver, a suction-cup-like device is placed on the plate-shaped workpiece and a vacuum is generated which presses the workpiece against the receiver. The adhesive effect is reduced again by pressure compensation, so that the workpiece can be released and deposited again.

Preferably, it is also proposed that the storage surfaces are each provided with grooves arranged in a grid. When a plate-shaped workpiece is lifted off, aerodynamic effects can cause adhesion to the storage surface, which makes it difficult to lift off the workpiece and is easily prevented by the grid-like arrangement of the grooves.

A receiving table can be provided in the storage region, which is equipped with at least two position sensors for the workpiece to be received. Although information on the type and characteristics of the workpiece fed to the storage region is usually available, the position of the workpiece can vary, for example by being fed to the receiving table rotated about a vertical axis. It can therefore be advantageous if position sensors are provided which can be designed as simple distance sensors directed against a front edge of the plate-shaped workpiece in order to detect a twisted position. The receiver can then pivot the workpiece accordingly in order to enable a precisely fitting and space-saving storage on a storage surface.

The receiving device may be of the type comprising a frame on which a support is mounted so as to be horizontally movable perpendicular to the longitudinal axis of the support, and a carriage mounted on the support so as to be movable in the longitudinal direction of the support, with the receiver being held on the carriage so as to be movable in a vertical direction. The movement of the support together with the movement of the carriage causes a movement of the receiver in a horizontal, plane parallel to the storage surface. Together with the receiver mounted on the carriage, which can be moved in a vertical direction, a movement of the receiver in all spatial directions can be achieved. This simple design of the receiving device is possible because of the horizontal storage of the workpieces on the storage surfaces, so that when the workpieces are fed in a horizontal position, a storage movement of the receiver is possible, in which the workpiece can remain in a horizontal position without tilting movements or the like being necessary.

Figure 2:
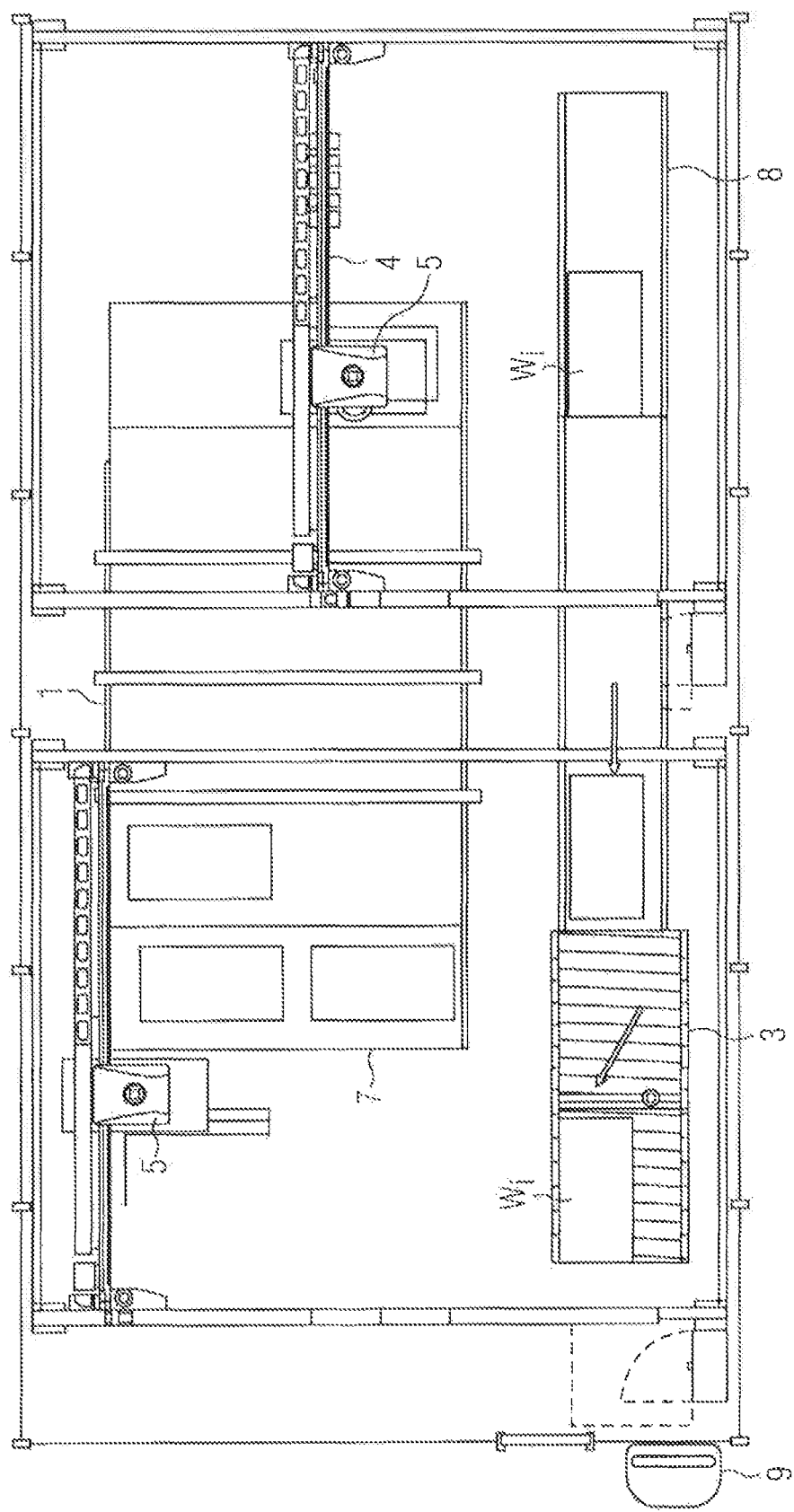
Figure 3:
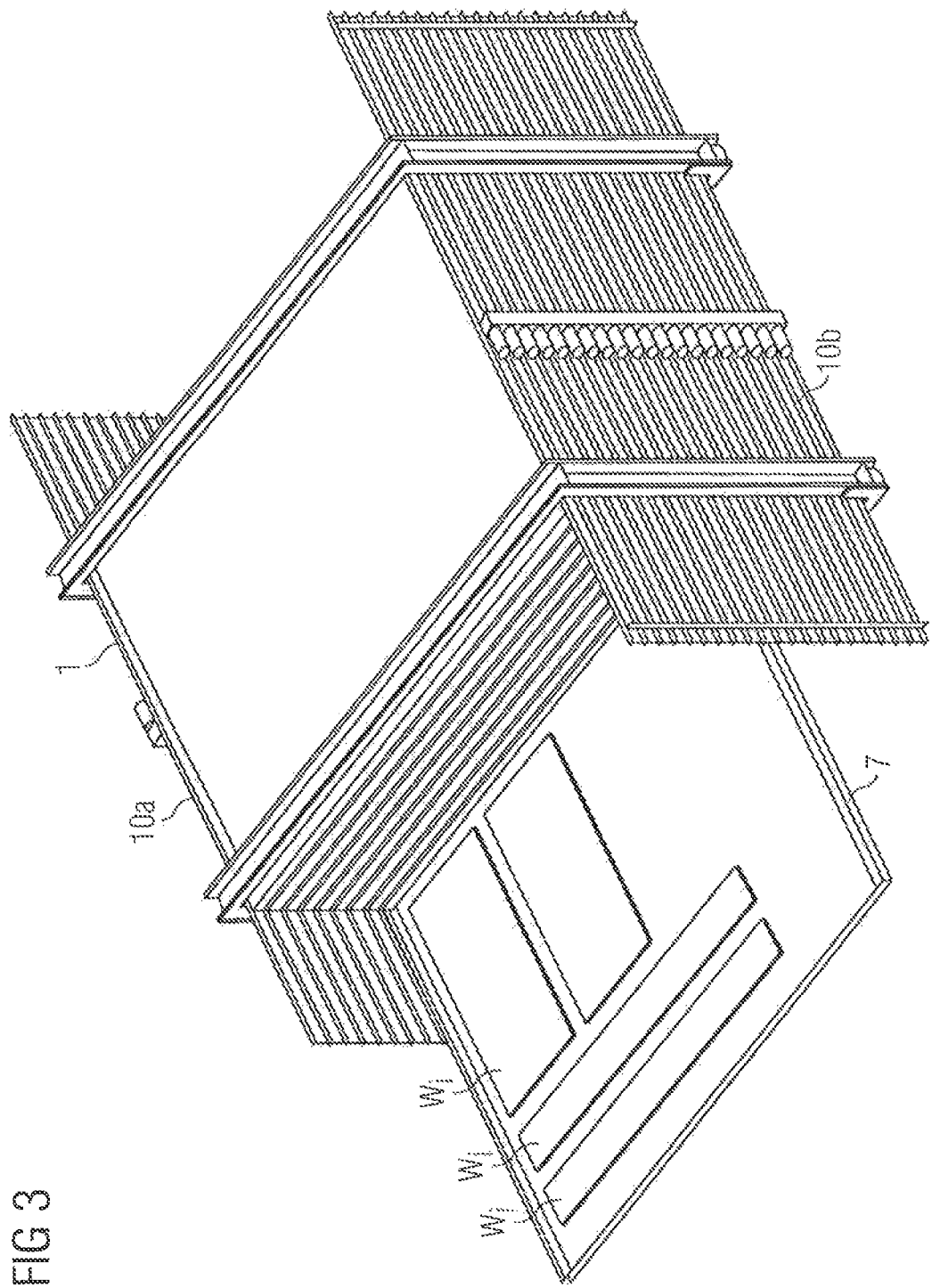
Figure 4:
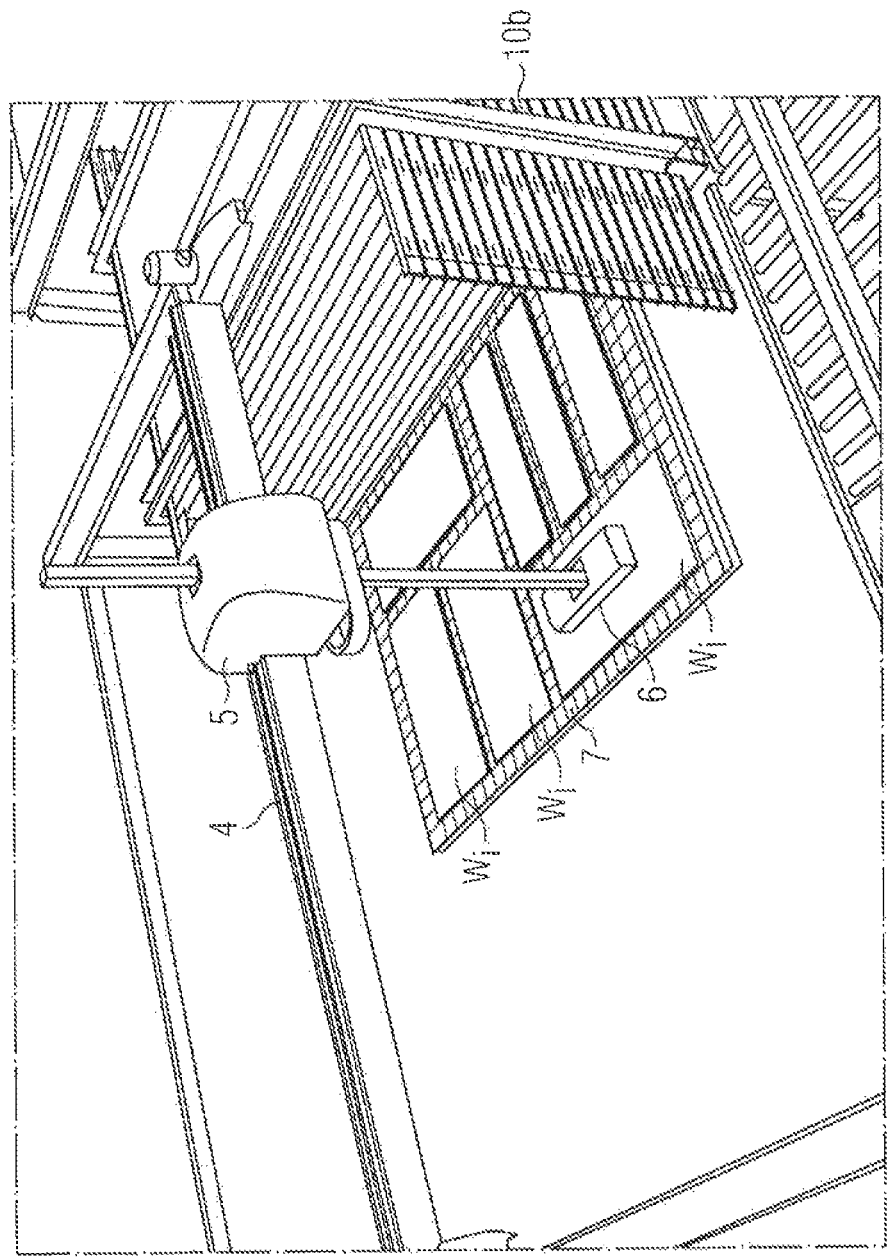
Figure 5:
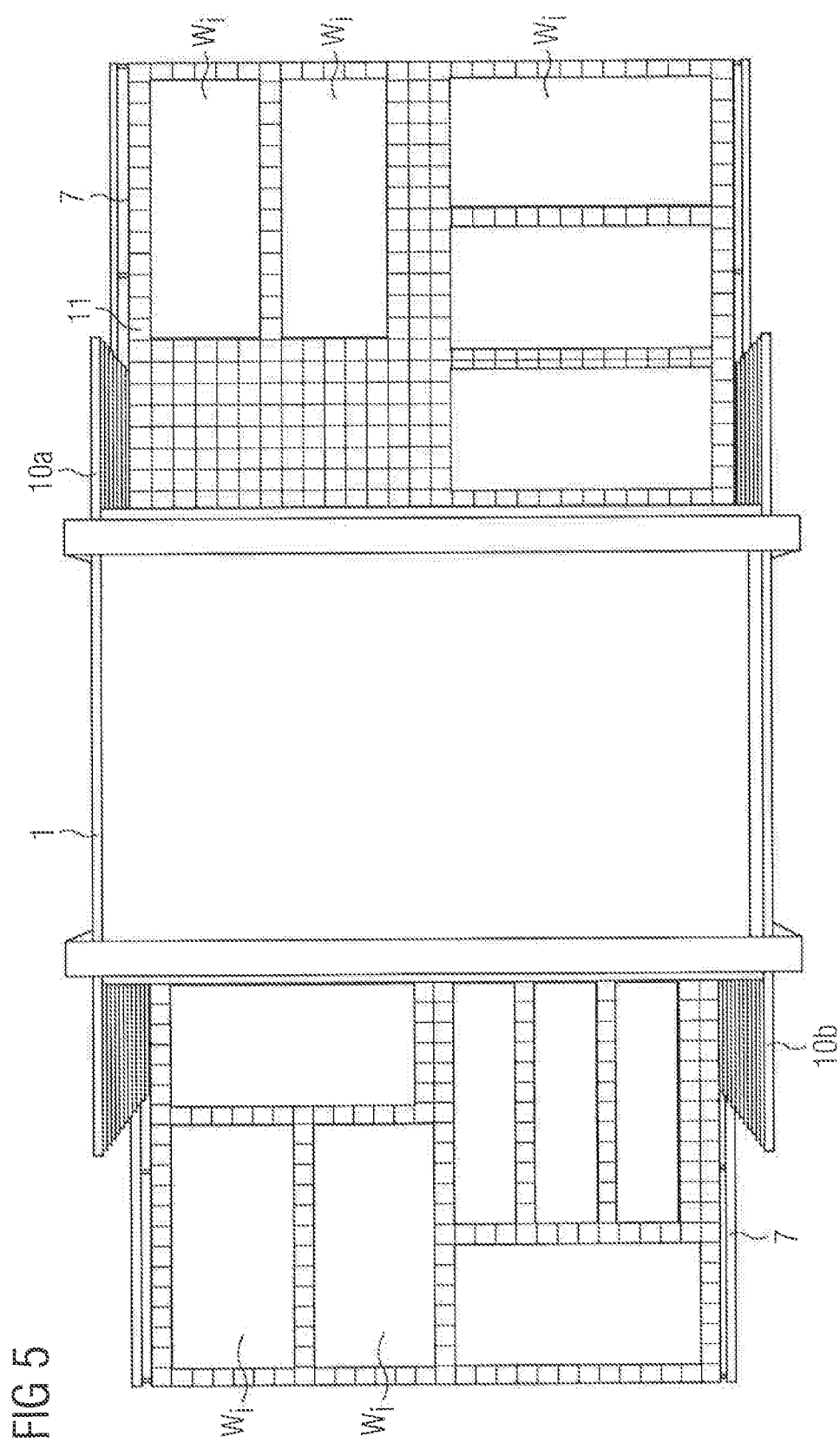

The invention will be explained in more detail below using an embodiment example from the enclosed drawings. The drawings show as follows:

FIG. 1 shows a perspective representation of an embodiment of the device according to the invention, FIG. 2 shows the embodiment according to FIG. 1 seen from above, FIG. 3 shows a perspective view of an embodiment of the receiving magazine, FIG. 4 shows a detailed view of the receiving magazine and the receiver when placing a workpiece on a storage surface of the receiving magazine, and FIG. 5 shows a further view of the embodiment according to FIG. 3 as seen from above.

First, reference is made to FIGS. 1 and 2, which show an embodiment of the device according to the invention having a receiving magazine 1 and a receiving device 2 arranged in a storage region and a removal region. The receiving magazine 1 is formed from storage compartments arranged one above the other for the plate-shaped workpieces, wherein the storage compartments have storage surfaces 7 which can be extended in a first horizontal direction into a storage region which is arranged on the left of the receiving magazine 1 with respect to FIGS. 1 and 2, and in a second horizontal direction into a removal region which is arranged on the right of the receiving magazine 1 with respect to FIGS. 1 and 2, and can be retracted into the receiving magazine 1. In the embodiment shown in FIGS. 1 to 5, the storage region and the removal region are arranged on opposite sides of the receiving magazine 1. In addition, a receiving table 3 is arranged in the storage region to which workpieces $W_i$ to be stored are fed. FIG. 1 shows the workpiece $W_i$ on the receiving table 3.

In the storage region and in the removal region, a frame is arranged in each case on which a support 4 is mounted in each case above the receiving magazine 1, which support is mounted so that it can be moved horizontally perpendicular to the longitudinal axis of the support 4. A carriage 5 which can be moved in the longitudinal direction of the support 4 is mounted on the respective support 4. On the carriage 5, a receiver 6 is again held movable in a vertical direction. The movement of the support 4 together with the movement of the carriage 5 causes a movement of the receiver 6 in a horizontal plane. Together with the vertically movable mounting of the receiver 6 on the carriage 5, a movement of the receiver 6 in all spatial directions can be achieved. The receiver 6 of the storage region is particularly capable of performing a storage movement in which a workpiece $W_i$ is picked up by the receiving table 3, moved over an extended storage surface 7 and is deposited on the intended storage surface 7. The receiver 6 of the removal region is particularly capable of performing a receiving movement in which a workpiece $W_i$ is lifted from an extended storage surface 7 and stored on a conveyor 8. The receiving magazine 1 is explained using FIG. 3. Receiving magazine 1 is formed from an essentially cuboid box which has a plurality of storage surfaces 7 arranged one above the other in its interior, each of which is movably mounted in lateral guide rails. The lateral guide rails are arranged on opposite side surfaces 10a, 10b of the receiving magazine 1, wherein these side surfaces 10a, 10b are extended in the direction of the storage and removal region for better guidance of the storage surfaces 7. The storage surfaces 7 are driven by belt pulls, toothed belts, gear racks or the like and are made to move by motors assigned to the respective storage surfaces 7. The motors of the storage surfaces 7 are actuated by a control and storage unit 9 (see e.g. FIG. 1). FIG. 3 shows a storage surface 7 in an extended position on which four workpieces $W_i$ have already been placed.

In the embodiment example shown, the receiver 6 is a vacuum receiver, in which a suction-cup-like device is placed on the plate-shaped workpiece $W_i$ and a vacuum is generated which presses the workpiece $W_i$ against the receiver 6 (see FIG. 4, for example). The adhesive effect is reduced again by pressure compensation, so that the workpiece can be released and deposited. The control of the movement of the receiver 6 and the control of the vacuum are also carried out using the control and storage unit 9.

As can be seen from FIG. 5, the storage surfaces 7 each have grooves 11 arranged in a grid pattern. When a plate-shaped workpiece $W_i$ is lifted off, aerodynamic effects can cause adhesion to the storage surface 7, which complicates the lifting of the workpiece $W_i$ and is easily prevented by the grid-like arrangement of the grooves 11.

As already mentioned, in modern production facilities the movement, location and machining condition of individual workpieces $W_i$ passing through the production facility are tracked. This monitoring can be carried out using transponders; RFID chips or other types of sensors located on workpieces $W_i$ and/or along production lines. The control and storage unit 9 is connected via an interface to the controller of the other sections of the production equipment and thus receives data records on individual workpieces Wi, which are fed to the storage region, and thus also knows, for example, the dimensions of the relevant workpiece $W_i$. The control and storage unit 9 also has data on the current storage locations of plate-shaped workpieces $W_i$ on the storage surfaces 7 of the receiving magazine 1. The control and storage unit 9 can thus match the dimensions of workpieces $W_i$ fed in with free storage surfaces 7 and initiate an extension movement of a free storage surface 7. Subsequently, the storage movement of the receiver 6 is controlled in such a way that the respective workpiece $W_i$ is placed on the designated storage surface 7.

Although information on the type and characteristics of the workpiece $W_i$ fed to the storage region is usually available, the position of the workpiece $W_i$ on the receiving table 3 can vary, for example by being fed to receiving table 3 rotated about a vertical axis. Position sensors are therefore provided on the receiving table 3, which can be designed as simple distance sensors directed against a front edge of the plate-shaped workpiece $W_i$ in order to detect a twisted position. The receiver 6 can then pivot the workpiece $W_i$ accordingly in order to enable a precisely fitting and space-saving storage on a storage surface 7. After storage of a workpiece $W_i$ on a storage surface 7, the data on the available storage surfaces 7 are updated accordingly. As soon as the control and storage unit 9 receives the request to remove a certain workpiece $W_i$ from subsequent sections of the production equipment, the storage location of the workpiece $W_i$ concerned is called up, the corresponding storage surface 7 is extended into the removal region and the receiver 6 in the removal region is controlled accordingly, so that in one removal movement the workpiece $W_i$ is lifted from the extended storage surface 7 and stored on the conveyor 8.

In this way, a device for temporarily storing plate-shaped workpieces is provided, which not only permits simple and gentle stacking of plate-shaped workpieces $W_i$, but in particular also enables integration into automated production facilities.

The invention claimed is:

1. A device for temporarily storing plate-shaped workpieces comprising:
   a receiving magazine, which is formed by storage compartments arranged one above the other, for the plate-shaped workpieces, the storage compartments having storage surfaces that are extendible in a first horizontal direction into a storage region and in a second horizontal direction into a removal region and that are retractable into the receiving magazine;
   a receiving device with a receiver for the plate-shaped workpieces, the receiving device being arranged in each of the storage region and the removal region to be movable in a plane parallel to the storage surfaces and in a direction perpendicular to the storage surfaces; and
   a control and storage unit for controlling at least one of storage or removal movement of the receiver in each of the storage region and the removal region, for controlling movement of the storage surfaces and for storing storage locations of plate-shaped workpieces on the storage surfaces.

2. The device according to claim 1, wherein the storage region and the removal region are arranged on opposite sides of the receiving magazine.

3. The device according to claim 1, wherein at least one of the first or second receiver is a vacuum receiver.

4. The device according to claim 1, wherein the storage surfaces are each provided with grooves arranged in a grid-like manner.

5. The device according to claim 1, further comprising a receiving table arranged in the storage region, which is provided with at least two position sensors for the workpiece to be received.

6. The device according to claim 1, wherein at least one of the first receiving device or the second receiving device comprises:
   a frame on which a support is mounted to be horizontally displaceable perpendicularly to a longitudinal axis of the support, and
   a carriage, which is displaceable in the longitudinal direction of the support, being mounted on the support,
   wherein the receiver is held on the carriage and is displaceable in a vertical direction.

7. The device according to claim 1, wherein the receiving device comprises a first receiving device with a first receiver for the plate-shaped workpieces arranged in the storage region to be movable in a plane parallel to the storage surfaces in the storage region and in a direction perpendicular to the storage surfaces in the storage region and a second receiving device with a second receiver for the plate-shaped workpieces in the removal region movable in a plane parallel to the storage surfaces in the removal region and in a direction perpendicular to the storage surfaces in the removal region.

* * * * *